Feb. 9, 1954
A. A. VARELA ET AL
2,668,942
POWER SUPPLY VOLTAGE REGULATOR
Filed Aug. 6, 1945
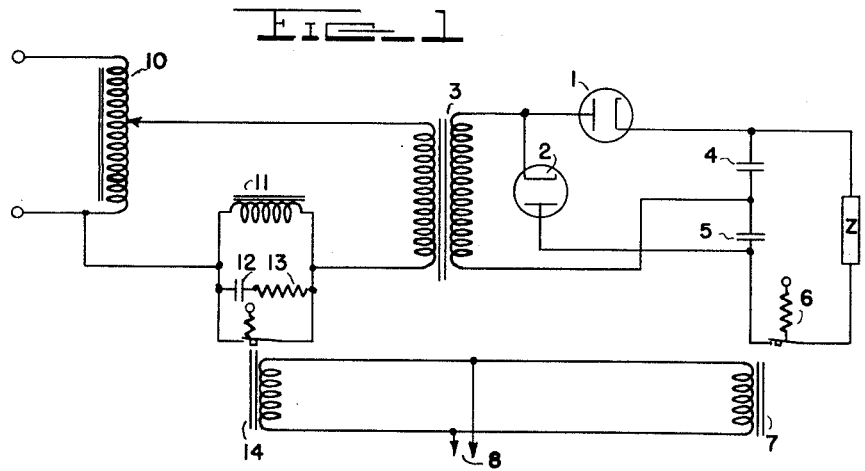
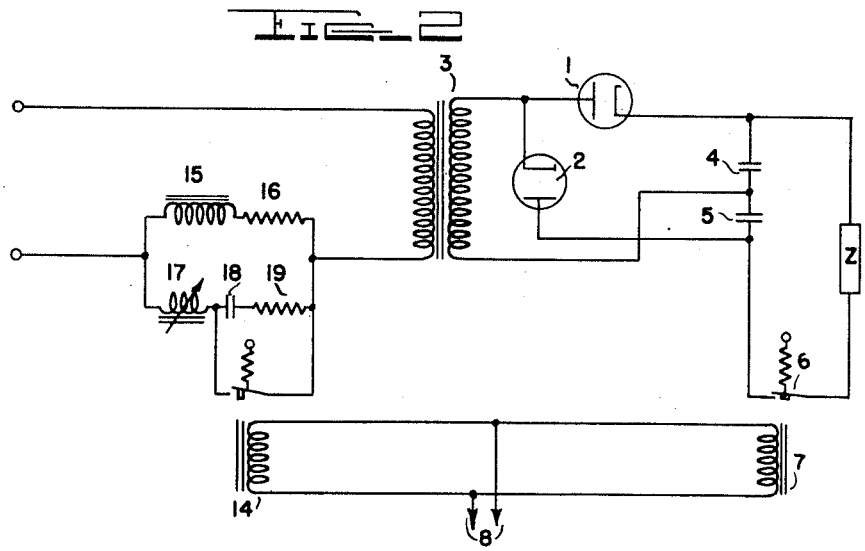
Inventors
ARTHUR A. VARELA
ROBERT A HERRING JR.
By *Ralph L. Chappell*
Attorney Patented Feb. 9, 1954

2,668,942

UNITED STATES PATENT OFFICE 2,668,942

POWER SUPPLY VOLTAGE REGULATOR

Arthur A. Varela and Robert A. Herring, Jr., Washington, D. C.

Application August 6, 1945, Serial No. 609,297

1 Claim. (Cl. 323—61)

(Granted under Title 35, U. S. Code (1952), sec. 266)

This invention relates to voltage regulation of rectifier power systems, and is particularly directed to high voltage supplies operated under intermittent loading.

In such intermittently operated systems, the no-load voltage rises to such increased values that considerable excess factor of safety must be incorporated in the design over that required for operation under loaded conditions.

Accordingly, it is the object of the invention to provide novel means for reducing the no-load voltage rise of a rectifier power supply system.

It is a further object of the invention to provide for control of the load voltage of a rectifier power system together with no-load regulation.

The invention will be described in connection with the exemplary embodiments shown in the drawings, in which:

Figure 1 is a circuit diagram of a system providing no-load voltage regulation.

Figure 2 is a circuit diagram of a system providing load voltage control and no-load voltage regulation.

The rectifier system of Figure 1 includes dual-element tubes 1 and 2 (heaters not shown) fed by power transformer 3 and arranged in a voltage doubler circuit with storage capacitors 4 and 5. The circuit including load impedance Z is controlled by switch 6 of relay 7 operated by control line 8.

The primary of power transformer 3 is energized from variable auto-transformer 10 which is employed for obtaining the desired output voltage. However, in order to prevent overvoltage on no-load operation parallel L—CR components 11, 12, and 13 are inserted in series in the feed circuit. These components are adjusted to antiresonance on or about the power supply frequency. Consequently the effective impedance of the input circuit is high, current in the primary of transformer 3 is held to a low value, and accordingly the rectifier output voltage is limited as desired.

For loaded operation, relay 14 is operated simultaneously with relay 7 to shunt out the parallel circuit when switch 6 is closed.

Damping resistor 13 is provided in the parallel circuit in order to avoid voltage surges under no-load conditions, which otherwise would reestablish the conditions, insofar as design requirements are concerned, which the invention eliminates. The value of resistor 13 may be determined experimentally. Preferably it will be sufficient at least to establish critical damping of the parallel circuit. Resistance 13 includes the resistance of inductance 11, which may in practice constitute all the resistance necessary in the circuit.

The circuit shown in Figure 2 includes an anti-resonant network having inductance 15 and resistor 16 in one branch and variable inductance 17, condenser 18, and resistor 19 in the other branch. Suitable values of the reactive components are selected to establish antiresonance substantially at the power frequency. The resistance values may be determined as above.

Relay 14 is provided to shunt out capacity 18 and resistor 19 for loaded operation and detune the circuit, which results in an input impedance determined substantially by inductance 17. Consequently the voltage output of the rectifier system to the load may be adjusted as operating conditions require. The normal value of inductance 17 is taken as the design center value in determining the parameters of the anti-resonant network. It will be understood that the circuit, as in the case of Figure 1, avoids transient voltage surges and permits close design to load voltage levels.

The invention described herein may be manufactured and used by or for the Government of the United States of America for governmental purposes without the payment of any royalties thereon or therefor.

We claim:

In a high voltage power supply system for operating under intermittent loading having a transformer with primary and secondary circuits, means for controlling the voltage on the secondary circuit comprising an anti-resonant network in the primary circuit having two parallel arms one comprised of an inductance and a damping resistance in series and the other comprised of a variable inductance a capacity and a resistance in series, and means for shunting out only the capacity and resistance from said last mentioned arm, whereby transients in the transformer primary are avoided upon operation of the said shunting means.

ARTHUR A. VARELA.
ROBERT A. HERRING, Jr.

References Cited in the file of this patent

UNITED STATES PATENTS

| Number | Name | Date |
|---|---|---|
| 1,687,474 | Engle et al. | Oct. 9, 1928 |
| 1,734,915 | Read | Nov. 5, 1929 |
| 1,753,921 | Edelmen | Apr. 8, 1930 |
| 1,755,111 | Gay | Apr. 15, 1930 |
| 2,033,071 | Hanley | Mar. 3, 1936 |
| 2,363,898 | Partington | Nov. 28, 1944 |

FOREIGN PATENTS

| Number | Country | Date |
|---|---|---|
| 30,936 | Denmark | Dec. 4, 1922 |
| 325,199 | Italy | Mar. 4, 1935 |
| 809,604 | France | Dec. 12, 1936 |
| 577,448 | Great Britain | May 17, 1946 |

OTHER REFERENCES

"Principles of Radio Engineering," pp. 96–100, by R. L. Glasgow, 1st ed., 1936, McGraw-Hill Book Co.